(12) United States Patent
Roy-Auberger et al.

(10) Patent No.: US 7,935,244 B2
(45) Date of Patent: May 3, 2011

(54) PROCESS FOR HYDROCONVERSION OF HEAVY HYDROCARBON FEEDS IN A SLURRY REACTOR IN THE PRESENCE OF A HETEROPOLYANION-BASED CATALYST

(75) Inventors: Magalie Roy-Auberger, Nivolas-Vermelle (FR); Denis Guillaume, Vienne (FR); Karin Marchand, Lyons (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 516 days.

(21) Appl. No.: 12/076,237

(22) Filed: Mar. 14, 2008

(65) Prior Publication Data
US 2008/0223755 A1    Sep. 18, 2008

(30) Foreign Application Priority Data

Mar. 16, 2007 (FR) ...................... 07 01982

(51) Int. Cl.
*C10G 47/02* (2006.01)
(52) U.S. Cl. ................ 208/108; 109/111.3; 109/111.35; 109/213; 109/217
(58) Field of Classification Search .................. 208/108, 208/109, 111.3, 111.35, 213, 217
See application file for complete search history.

(56) References Cited

U.S. PATENT DOCUMENTS

| | | | | |
|---|---|---|---|---|
| 4,499,203 | A | * | 2/1985 | Toulhoat et al. ............... 502/247 |
| 5,320,741 | A | * | 6/1994 | Johnson et al. ................. 208/49 |
| 2004/0132614 | A1 | * | 7/2004 | Harle et al. ................... 502/313 |

FOREIGN PATENT DOCUMENTS

| | | |
|---|---|---|
| EP | 0 271 337 A2 | 6/1988 |
| EP | 0 565 205 A | 10/1993 |
| FR | 2 528 721 A1 | 12/1983 |
| FR | 2 843 050 A1 | 2/2004 |
| FR | 2 895 284 A | 6/2007 |

OTHER PUBLICATIONS

Martin, C. et al., "Evidence and characterization of a new decamolybdocobaltate cobalt salt: an efficient precursor for hydrotreatment catalyst preparation," Chemistry of Materials, American Chemical Society, vol. 17, 2005, pp. 4438-4448, XP002420874.

Szlavik et al., "Video camera registration using accumulated co-motion maps," ISPRS Journal of Photogrammetry and Remote Sensing, vol. 61 No. 5, Dec. 23, 2006, pp. 298-306, XP005734896.

* cited by examiner

*Primary Examiner* — Glenn A Caldarola
*Assistant Examiner* — Michelle L Stein
(74) *Attorney, Agent, or Firm* — Millen, White, Zelano & Branigan, P.C.

(57) ABSTRACT

The invention concerns a process for slurry phase hydroconversion of liquid sulphur-containing heavy hydrocarbon feeds, in the presence of hydrogen and in the presence of a solid catalyst, said catalyst being obtained from an aqueous solution formed from at least one cobalt and/or nickel salt of at least one heteropolyanion combining molybdenum and cobalt or molybdenum and nickel in its structure. The aqueous solution is introduced into a hydrocarbon oil containing asphaltenes and/or resins to form an emulsion and said emulsion is then injected upstream or directly into the slurry reactor.

26 Claims, No Drawings

PROCESS FOR HYDROCONVERSION OF HEAVY HYDROCARBON FEEDS IN A SLURRY REACTOR IN THE PRESENCE OF A HETEROPOLYANION-BASED CATALYST

FIELD OF THE INVENTION

The invention relates to a process for slurry phase hydroconversion of liquid sulphur-containing heavy hydrocarbon feeds, in the presence of hydrogen and in the presence of a solid catalyst, said catalyst being obtained from an aqueous solution formed by at least one cobalt and/or nickel salt of at least one heteropolyanion combining molybdenum and cobalt or molybdenum and nickel in its structure.

PRIOR ART

The slurry phase process used for hydroconversion of heavy hydrocarbon fractions is a process which is known to the skilled person and which can accomplish the hydrorefining of heavy feeds in the presence of a soluble catalytic precursor. U.S. Pat. No. 3,231,488 discloses that metals, injected in an organometallic form, form a finely dispersed catalytic phase in the presence of hydrogen and/or $H_2S$, which phase can accomplish residue hydrorefining after injection into the feed.

The organometallic compound or compounds are selected from metals from groups VB, VIB and group VIII and are heat decomposed to form a complex with the asphaltenes before being mixed with the feed.

In U.S. Pat. No. 4,244,839, C L Aldridge and R Bearden describe a catalytic phase, in particular for residue hydroconversion, prepared from a catalytic precursor which is soluble in the oil and heat decomposable, brought into contact with a feed at high temperature and in the presence of hydrogen and $H_2S$. The metal is selected from metals from groups II, III, IV, V, VIIB, VIIB and VIII.

A number of catalytic precursors may act as heat decomposable metallic compounds: organosoluble compounds such as molybdenum naphthenate or molybdenum octoate, but also hydrosoluble compounds such as phosphomolybdic acid cited in the following patents: U.S. Pat. No. 3,231,488 (UOP), U.S. Pat. Nos. 4,637,870 and 4,637,871, or ammonium heptamolybdate cited in U.S. Pat. No. 6,043,182.

In the case of hydrosoluble compounds, the catalytic precursor is generally mixed with the feed via an emulsion. Dissolving the catalytic precursor (in general molybdenum) which may or may not be promoted by cobalt or nickel in an acid medium ($H_3PO_4$) or basic medium ($NH_4OH$) has constituted the subject matter of many studies and patents.

Thus, Chevron in documents WO-2006/031575A1, WO-2006/031543A1 and WO-2006/031570A1, dissolve a group VI oxide with an aqueous ammoniacal solution to form a solution which is then sulphurized, optionally promoted by adding a group VI metal after said sulphurization and mixed with the feed in the last step.

Further, Exxon patents U.S. Pat. Nos. 4,637,870 and 4,637,871 dissolve molybdenum by adding $H_3PO_4$ to phosphomolybdic acid or to $MoO_3$ without a promoter and within certain ranges of the P/Mo ratio and Mo concentration (<5% by weight).

In the Applicant's European patent EP-1 637 576, the slurry hydroconversion process uses a catalytic fraction obtained from a catalytic precursor which is an organometallic compound, a salt or an acid based on molybdenum.

The prior art makes no mention anywhere of heavy fraction slurry hydroconversion processes using catalysts the catalytic precursor of which employs a heteropolyanion associating at least molybdenum and cobalt or molybdenum and nickel in the same molecule.

The Applicant has discovered that the dispersed catalyst obtained from a catalytic precursor based on such a heteropolyanion has a significantly improved activity in terms of hydrodemetallization and hydrodeasphalting when using a slurry type reactor compared with separate injection of a molybdenum precursor and a nickel or cobalt precursor in aqueous solution. Further, the Applicant has also discovered that in addition to advantages in terms of catalytic activity, it is particularly advantageous to prepare the catalytic precursor using a "direct" preparation method. Said preparation method can in fact produce pH conditions which are highly favourable to the creation of a stable emulsion of the aqueous solution in a hydrocarbon oil containing asphaltenes and/or resins.

DESCRIPTION OF THE INVENTION

The invention concerns a process for converting heavy feeds carried out in a slurry reactor in the presence of hydrogen and a solid catalyst, said catalyst being obtained from an aqueous solution containing at least one cobalt and/or nickel salt of at least one heteropolyanion combining molybdenum and cobalt in its structure, said salt being $Co^{II}_3$ $[Co^{III}_2Mo_{10}O_{38}H_4]$ or $Ni^{II}_3[Co^{III}_2Mo_{10}O_{38}H_4]$, alone or respectively as a mixture with the salt $Co^{II}_{3/2}$ $[Co^{III}Mo_6O_{24}H_6]$ or the salt $Ni^{II}_2[Ni^{II}Mo_6O_{24}H_6]$ or from an aqueous solution containing at least one cobalt and/or nickel salt of at least one heteropolyanion combining molybdenum and nickel in its structure, said process including the following steps:

mixing at least one source of molybdenum and at least one oxidizing compound in aqueous solution to synthesize peroxomolybdate ions at an acidic pH, the (oxidizing compound/molybdenum source) mole ratio being in the range 0.1 to 20;

a) introducing at least one cobalt and/or nickel precursor using one of the following pathways (b1, b2 or b3):

b1) introducing at least one cobalt precursor into the solution of step a) in the absence of a nickel precursor, to form a solution comprising at least said salt wherein the Co/Mo mole ratio is in the range 0.40 to 0.85;

b2) introducing at least one nickel precursor into the solution of step a) in the absence of a cobalt precursor, to form a solution comprising at least said salt wherein the Ni/Mo ratio is in the range 0.40 to 0.85;

b3) introducing at least one cobalt precursor and at least one nickel precursor into the solution of step a) to form a solution comprising at least said salts, wherein the (Co+Ni)/Mo mole ratio is in the range 0.25 to 0.85, the Ni/Mo ratio is in the range 0.15 to 0.45 and the Co/Mo ratio is in the range 0.10 to 0.40;

c) introducing the aqueous solution obtained in step b) into a hydrocarbon oil containing asphaltenes and/or resins at a temperature below 60° C. to form an emulsion;

d) injecting said emulsion obtained at the end of step c) upstream of or directly into the slurry reactor.

Anderson structure heteropolyanions are known to the skilled person. Isopolyanions, denoted $M_kO_y^{\prime-}$, are obtained by condensing oxoanions $MO_4^{n-}$ where M is a metal atom. Condensation occurs by acidification of the medium and then water molecules are eliminated and oxo bridges are created between the metal atoms. Molybdenum compounds are well known for this type of reaction since, depending on the pH, the molybdenum compound in solution may be in the $MoO_4^{2-}$ form or in the form of an Anderson isopolyanion $Mo_7O_{24}^{6-}$ obtained in accordance with the reaction:

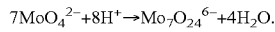

$$7MoO_4^{2-} + 8H^+ \rightarrow Mo_7O_{24}^{6-} + 4H_2O.$$

In the presence of an oxo anion $XO_4^{p-}$, where X is an atom which is different from M, the metal atoms associate around this oxo anion and polycondensation then results in a mixed species termed a heteropolyanion and denoted $X_xM_kO_y^{z-}$. The heteropolyanions $Co^{III}Mo_6O_{24}H_6^{3-}$ and $Ni^{II}Mo_6O_{24}H_6^{4-}$ are good examples of Anderson heteropolyanions.

Preparation of Catalytic Precursor Solution (Aqueous Solution)

In contrast to the "indirect" preparation method as described, for example, in EP-A-1 393 802, the process of the invention uses a "direct" method for preparing an aqueous solution containing the catalytic precursor. The indirect method consists of preparing an ammonium salt of the heteropolyanion, necessitating precipitation, filtration and crystallization steps, then solution exchanging the ammonium ions of the heteropolyanion with cobalt or nickel cations, by adding to the reaction medium a compound the anion of which forms a highly insoluble compound with ammonium cations which is separated from the solution containing the cobalt and/or nickel cations and the heteropolyanion. The indirect method also necessitates the use of a dimerizing agent such as activated charcoal or Raney nickel. Further, the compounds used for the exchange reaction are generally cobalt or nickel salts of phosphomolybdic acid; the preparation of these salts also requires carrying out a certain number of lengthy elementary steps which are difficult to carry out on an industrial scale.

The Applicant has already developed a novel "direct" method for preparing a solution formed by at least one cobalt and/or nickel salt of at least one heteropolyanion combining molybdenum and cobalt or molybdenum and nickel in its structure, said preparation process comprising the following steps:

a) mixing at least one source of molybdenum and at least one oxidizing compound in aqueous solution to synthesize peroxomolybdate ions at an acidic pH, the (oxidizing compound/molybdenum source) mole ratio being in the range 0.1 to 20;

b) introducing at least one cobalt precursor and/or at least one nickel precursor into the solution from step a) to form a solution comprising at least said salt.

Step a) results in the synthesis of peroxomolybdate ions which belong to the group constituted by the monomeric peroxomolybdate entity $MoO_3(O_2)^{2-}$, the dimeric peroxomolybdate entity $Mo_2O_3(O_2)_4^{2-}$ and intermediate monomeric di-, tri- and tetra-peroxomolybdate species with formula $MoO_2(O_2)_2^{2-}$, $MoO(O_2)_3^{2-}$ and $Mo(O_2)_4^{2-}$, and mixtures thereof. Preferably, the synthesis conditions are adapted during step a) to prepare dimeric peroxomolybdate ions, the principal peaks of which in Raman spectroscopy are located at 540 $cm^{-1}$ and 970 $cm^{-1}$. Monomeric peroxomolybdate ions are characterized in Raman spectroscopy by principal peaks located at 560 and 930 $cm^{-1}$, and the monomeric di-, tri- and tetra-peroxomolybdate species are characterized by intermediate peaks in the range 540 to 560 $cm^{-1}$ and in the range 930 to 970 $cm^{-1}$ and correspond to elongation modes.

Said step a) of the preparation process is carried out by mixing at least one source of molybdenum and at least one oxidizing compound in aqueous solution. Mixing is carried out until a clear aqueous solution is obtained in which the molybdenum source is entirely dissolved by the action of said oxidizing compound. This mixture may be produced by stirring at ambient temperature, or it may be heated under reflux between 30° C. and 90° C., preferably between 50° C. and 60° C., for a few minutes to a few hours until a clear aqueous solution is obtained. Said clear solution, obtained at the end of step a) and containing said peroxomolybdate ions, has an acidic pH, more precisely a pH of less than 5, preferably less than 2.5, highly preferably less than 1 and still more preferably less than 0.5.

The source of molybdenum used to carry out said step a) of the preparation process of the invention is generally selected from molybdenum oxides, molybdenum hydroxides, molybdic acids and salts thereof, in particular ammonium salts such as ammonium molybdate, dimolybdate, heptamolybdate and octamolybdate.

Preferably, the molybdenum source is molybdenum oxide, $MoO_3$.

The oxidizing compound used to carry out said step a) of the preparation process is selected from hydrogen peroxide, $H_2O_2$, and alkyl hydroperoxides (R—OOH), in particular tertiobutyl-hydroperoxide (tBu-OOH). Hydrogen peroxide is advantageously used as the oxidizing compound.

In step a) of the process of the invention, said oxidizing compound and the molybdenum source are mixed in aqueous solution in proportions such that the mole ratio between the oxidizing compound and the molybdenum source is in the range 0.1 to 20, advantageously in the range 0.5 to 10 and highly advantageously in the range 2 to 7.

In accordance with step b) of the preparation process, at least one cobalt precursor and/or at least one nickel precursor is (are) introduced into the clear aqueous solution with an acidic pH derived from said step a), to form a solution comprising at least one cobalt salt and/or nickel salt of at least one heteropolyanion combining molybdenum and cobalt or molybdenum and nickel in its structure. Said solution obtained at the end of step b) of the process of the invention has a pH of more than 3, preferably 3.5 or more and highly preferably in the range 3.5 to 4.0. Preferably, said step b) results in the formation of a solution comprising at least one cobalt or nickel salt of at least one heteropolyanion combining molybdenum and cobalt or molybdenum and nickel in its structure, said salt belonging to the group constituted by the salts $Co^{II}_{3/2}[Co^{III}Mo_6O_{24}H_6]$, $Ni^{II}_{3/2}[Co^{III}Mo_6O_{24}H_6]$, $Co^{II}_3[Co^{III}_2Mo_{10}O_{38}H_4]$, $Ni^{II}_3[Co^{III}_2Mo_{10}O_{38}H_4]$, $Ni^{II}_2[Ni^{II}Mo_6O_{24}H_6]$ and $Ni^{II}_4[Ni^{II}_2Mo_{10}O_{38}H_4]$ The cobalt and/or nickel precursors introduced into the solution containing the peroxomolybdate ions from the end of step a) are advantageously selected from the group constituted by nitrates, sulphates, phosphates, halides, carboxylates such as acetates, carbonates, hydroxides and oxides. Preferably, precursors based on carbonate are used, along with precursors based on hydroxide and hydroxycarbonate precursors. The preferred cobalt precursor is cobalt carbonate and the preferred nickel precursor is nickel hydroxycarbonate.

The cobalt and/or nickel precursors are advantageously introduced into the solution from step a), preferably after cooling it to ambient temperature in the case in which dissolution is carried out at a temperature above ambient temperature. Said precursors are introduced with care and in a controlled manner to accommodate the exothermicity and effervescence which occurs when using certain precursors, in particular those based on carbonate. Preferably, cobalt and/or nickel precursors are not introduced in the presence of a strong acid, especially $H_2SO_4$, $HNO_3$ or HCl.

In a first implementation of step b) (step b1), at least one cobalt precursor is introduced into said solution derived from step a) in the absence of nickel precursor, to form at least one cobalt salt of at least one heteropolyanion combining molybdenum and cobalt in its structure. The cobalt precursor is introduced in a quantity such that the Co/Mo mole ratio is in the range 0.40 to 0.85, preferably in the range 0.40 to 0.55. Particular salts prepared using this first implementation are $Co^{II}_{3/2}[Co^{III}Mo_6O_{24}H_6]$ corresponding to the monomeric Anderson heteropolyanion $(Co^{III}Mo_6O_{24}H_6)^{3-}$ and the salt $Co^{II}_3[Co^{III}_2Mo_{10}O_{38}H_4]$ corresponding to the dimeric Anderson heteropolyanion $(Co^{III}_2Mo_{10}O_{38}H_4)^{6-}$. They may be present alone or as a mixture in said solution from step b). Said salts preferably use cobalt carbonate $Co(CO_3)_2$ as a cobalt precursor.

In a second implementation of step b) (step b2), at least one nickel precursor is introduced into said solution derived from step a) in the absence of a cobalt precursor, to form at least one nickel salt of at least one heteropolyanion combining molybdenum and nickel in its structure. The nickel precursor is introduced in a quantity such that the Ni/Mo mole ratio is in the range 0.40 and 0.85, preferably in the range 0.45 to 0.65. Particular salts prepared using this second implementation are the salt $Ni^{II}_2[Ni^{II}Mo_6O_{24}H_6]$ corresponding to the monomeric Anderson heteropolyanion $(Ni^{II}Mo_6O_{24}H_6)^{4-}$ and the salt $Ni^{II}_4[Ni^{II}_2Mo_{10}O_{38}H_4]$ corresponding to the dimeric Anderson heteropolyanion $(Ni^{II}_2Mo_{10}O_{38}H_4)^{8-}$ They may be present in said solution from step b) alone or as a mixture. Such salts preferably use nickel hydroxycarbonate as the nickel precursor.

In a third implementation of step b) (step b3), at least one cobalt precursor and at least one nickel precursor are introduced into said clear solution from step a). Preferably, said step b3) is implemented by introducing at least one nickel precursor followed by introducing at least one cobalt precursor into said solution from step a). The cobalt and nickel precursors are introduced in a proportion such that the (Co+Ni)/Mo mole ratio is in the range 0.25 to 0.85 and preferably in the range 0.28 to 0.55. The nickel precursor is introduced in a proportion such that the Ni/Mo mole ratio is in the range 0.15 to 0.45, preferably in the range 0.25 to 0.35. The cobalt precursor is introduced in a proportion such that the Co/Mo mole ratio is in the range 0.10 to 0.40, preferably in the range 0.15 to 0.25. Particular salts prepared using this third implementation are the salt $Ni^{II}_{3/2}[Co^{III}Mo_6O_{24}H_6]$ corresponding to the monomeric Anderson heteropolyanion $(Co^{III}Mo_6O_{24}H_6)^{3-}$ and the salt $Ni^{II}_3[Co^{II}_2Mo_{10}O_{38}H_6]$, corresponding to the dimeric Anderson heteropolyanion $(Co^{III}_2Mo_{10}O_{38}H_4)^{6-}$. They may be present in said solution from step b) alone or as a mixture. Preferably, the preparation of said salts uses nickel hydroxycarbonate as the nickel precursor and cobalt carbonate as the cobalt precursor.

The presence in solution of at least one Co and/or Ni salt of at least one monomeric $(Co^{III}Mo_6O_{24}H_6^{3-}, Ni^{III}Mo_6O_{24}H_6^{4-})$ and dimeric $(Co^{III}_2Mo_{10}O_{38}H_4^{6-}, Ni^{II}_2Mo_{10}O_{38}H_4^{8-})$ Anderson heteropolyanion may be characterized by Raman spectroscopy by dint of the relative displacements of the elongation modes of Mo—$O_{2t}$ bonds at 903, 920 and 952 cm$^{-1}$ for the monomeric Anderson heteropolyanions and at 917 and 957 cm$^{-1}$ for the dimeric Anderson heteropolyanions. Similarly in Raman spectroscopy, the displacements corresponding to the vibrational modes of Mo—O—X bonds (where X=Co or Ni) are located at 560 and 575 cm$^{-1}$ for monomeric species and at 565 and 602 cm$^{-1}$ for dimeric species. In solution, in the case of Co and/or Ni salts of Anderson heteropolyanions based on molybdenum and cobalt, cobalt with an oxidation number of +3 in the Anderson heteropolyanion structure can also be discerned, by UV-visible spectroscopy, from the cobalt or nickel with an oxidation number of +2 present as a counter ion in the salt. The $Co^{2+}$ or $Ni^{2+}$ is characterized by an absorption band at 510-515 nm, corresponding to the $^4T_{2g} \to {}^4T_{1g}$ transition of $Co^{2+}$ (d7) or $Ni^{2+}$ (d7s1) in an octahedral environment, while $Co^{3+}$ is characterized by 2 absorption bands at 410 and 600 nm, attributed to two d-d transitions of $Co^{3+}$ (d6) in octahedral coordination, respectively $^2A_{1g} \to {}^1T_{2g}$ and $^1A_{1g} \to {}^1T_{1g}$.

Co and/or Ni salt(s) of at least one Anderson heteropolyanion combining molybdenum and cobalt or molybdenum and nickel in its structure prepared as described above have the same Raman and UV-visible characteristics as those exhibited by the salts of heteropolyanions prepared using the indirect method described in EP-A-1 393 802.

The aim of the present invention is to form a solution formed by at least one salt of cobalt and/or nickel of at least one Anderson heteropolyanion combining molybdenum and cobalt or molybdenum and nickel in its structure for the preparation of a catalyst for slurry phase hydroconversion of heavy hydrocarbon feeds.

More precisely, in the context of the present invention, the aqueous solution containing at least one cobalt and/or nickel salt of at least one Anderson heteropolyanion combining molybdenum and cobalt or molybdenum and nickel in its structure is introduced into a hydrocarbon feed to form an emulsion, and the salts and heteropolyanions are transformed into a dispersed mixed sulphide phase under partial pressure of $H_2S$ (pp $H_2S$) and temperature conditions which are suitable for forming an active catalyst for the hydroconversion of heavy hydrocarbon feeds.

The particular structure of the Anderson HPA has the advantage of combining Mo and Co or Mo and Ni in its structure, ensuring a strong interaction of said cobalt or nickel with the molybdenum and thus a high degree of promotion. The cobalt and/or nickel salt(s) of at least one heteropolyanion combining molybdenum and cobalt or molybdenum and nickel in its structure is (are) preferably selected from the following salts: $Co^{II}_{3/2}[Co^{III}Mo_6O_{24}H_6]$, $Ni^{II}_{3/2}[Co^{III}Mo_6O_{24}H_6]$, $Co^{II}_3[Co^{III}_2Mo_{10}O_{38}H_4]$, $N^{II}_3[Co^{III}_2Mo_{10}O_{38}H_4]$, $Ni^{II}_2[Ni^{II}Mo_6O_{24}H_6]$ and $Ni^{II}_4[Ni^{II}_2Mo_{10}O_{38}H_4]$. After sulphurization, the Co/Mo and Ni/Mo ratios of the $MoS_2$ lamellae generated are optimal to ensure the promotion of the Mo activity. The dispersed catalyst thus has a greatly improved activity compared with injecting a precursor of molybdenum and a precursor of nickel in aqueous solution.

Further, the aqueous solution formed in accordance with the invention has a pH of more than 3, preferably 3.5 or more and more preferably in the range 3.5 to 4, which is highly favourable to the creation of a stable emulsion of the aqueous solution with a hydrocarbon oil containing asphaltenes and/or resins.

Further, the concentration of molybdenum in the solutions prepared in this manner may rise to values as high as 2.6 moles of molybdenum per litre of aqueous solution, which can limit the quantity of water to be introduced into the process.

Preparation of Emulsion

The aqueous solution containing at least one cobalt and/or nickel salt of at least one Anderson heteropolyanion combining molybdenum and cobalt in its structure is mixed with a hydrocarbon oil containing asphaltenes and/or resins at a temperature of less than 60° C., preferably less than 50° C. A "water-in-oil" type emulsion is thus obtained.

Any mixing and stirring technique which is known to the skilled person may be used.

In a preferred implementation of the invention, mixing is carried out so that the (asphaltenes+resins)/group VIB metal) ratio is more than 1, preferably 2 or more.

Said emulsion may then be dried or injected as is along with the feed to be converted upstream of the slurry reactor.

Implementation

The emulsion containing the catalytic precursor is injected into and mixed with the feed to be treated, either upstream thereof or directly into the reactor. In the case of upstream injection, the mixture of the feed and emulsion is advantageously heat treated outside the reactor at a temperature of 400° C. or less, preferably in the range 250° C. to 400° C., in the presence of $H_2S$ dissolved in the feed, to encourage decomposition of the catalytic precursor into the sulphide phase, thereby generating an active phase.

The $H_2S$ may, for example, derive from the $H_2S$ contained in the hydrogen recycled to the slurry reactor, or from the thermal decomposition of organo-sulphur molecules present in or introduced (injection of DMDS, etc) into the feed.

In a preferred implementation of the invention, the emulsion containing the catalytic precursor is injected into at least a portion of the liquid conversion products which contain dissolved hydrogen sulphide, under temperature and pressure conditions close to those of the reaction zone, which results in the formation of the solid catalytic phase which is then injected into the reactor with the feed.

In another preferred implementation, the emulsion containing the precursor is injected into part or all of the feed and the precursor is sulphurized by dint of the dissolved hydrogen sulphide before it arrives at the reaction zone.

Once formed, the dispersed catalyst circulates with the hydrocarbon phase in the reactor and at its outlet at concentrations in the range 10 to 1000 ppm by weight of molybdenum with respect to the heavy feed, preferably between 50 and 500 ppm by weight.

Advantageously, part of the converted effluents may be recycled upstream of the unit carrying out the hydroconversion process. These recycled effluents contain part of the catalyst, which is also recycled.

It may be advantageous to add solid particles to the feed-emulsion mixture. Said solid particles are in the form of the oxide, the oxide generally being selected from the group formed by alumina, silica, silica-alumina, or titanium dioxide, or they may be particles of coal or coke.

Preferably, the oxide is alumina.

More preferably, said oxide particles are particles of alumina with a porous polymodal structure composed of a plurality of juxtaposed agglomerates each formed by a plurality of acicular platelets, the platelets of each agglomerate being orientated radially with respect to each other and with respect to the centre of the agglomerate, said particles having an irregular and non spherical shape and being mainly in the form of fragments obtained by crushing alumina beads and having the following characteristics:

a loss on ignition, measured by calcining at 1000° C., in the range from about 1% to 15% by weight;

a specific surface area in the range 75 to 250 m²/g, a total pore volume (TPV) in the range 0.5 to about 2.0 cm³/g;

a pore distribution, determined by Hg porosimetry, which is characterized as follows:

a total pore volume of pores with a mean diameter of less than 100 Å: in the range 0 to 10%;

a total pore volume of pores with a mean diameter in the range 100 to 1000 Å: in the range 40% to 80%;

a total pore volume of pores with a mean diameter in the range 1000 to 500 Å: in the range 5% to 60%, preferably in the range 8% to 35%;

a total pore volume of pores with a mean diameter in the range 5000 to 10000 Å: in the range 3% to 50%, preferably in the range 5% to 30%;

a total pore volume of pores with a mean diameter of more than 10000 Å: in the range 5% to 20%.

Preferably, the percentage of the total pore volume in pores with a diameter of more than 1000 Å is more than 20% and the mean diameter of pores with a diameter of more than 1000 Å is in the range 4000 to 6000 Å.

The mean solid particle size is in the range 10 to 1000 microns, preferably in the range 100 to 800 microns.

The concentration of solid particles in the heavy hydrocarbon feed is in the range 0.1% to 20% by weight, preferably in the range 0.5% to 10% by weight.

The solid particles are added by injecting said particles either into the mixture of the feed and the emulsion upstream of the reactor or directly into the reactor.

The following slurry hydroconversion conditions are generally favourable:

a total pressure in the range 1 to 50 MPa, preferably 2-30 MPa;

a partial pressure of hydrogen in the range 1 to 50 MPa, preferably 2-30 MPa;

a temperature in the range 300° C. to 600° C., preferably in the range 350° C. to 500° C.;

a residence time for the liquid hydrocarbons in the reaction zone in the range 5 minutes to 20 hours, preferably in the range 1 h to 10 h.

The heavy feeds treated by the process of the invention are heavy hydrocarbon feeds such as distillates or residues derived from vacuum oil distillation. It may also be coal or coke introduced in suspension into liquid oil cuts.

More generally, the process is particularly suitable for the treatment of oil cuts such as atmospheric residues obtained by column bottom atmospheric distillation or a fraction of such residues, or residues from vacuum distillation (column bottom). Such cuts are generally characterized by a boiling point of more than 540° C. for at least 60% by weight, preferably at least 80% by weight, of compounds of the feed having initial boiling points of more than 300° C. They generally have a viscosity of less than 40000 cSt at 100° C., preferably less than 20000 cSt at 100° C., a Ni+V metals content of more than 1 ppm by weight, and an asphaltenes content (precipitated in heptane) of more than 0.1% by weight.

The following examples illustrate the advantages of the invention without in any way limiting its scope.

EXAMPLE 1

Preparation of a Solution of $Co^{II}_{3/2}[Co^{III}Mo_6O_{24}H_6]$ Corresponding to the Monomeric Anderson Heteropolyanion and $Co^{II}_3[Co^{III}_2Mo_{10}O_{38}H_4]$, Corresponding to the Dimeric Anderson Heteropolyanion (in Accordance with the Invention)

77 g of hydrogen peroxide (30% purity) was introduced into a flask, then 21.2 g of $MoO_3$ (96% purity) was introduced: the $H_2O_2$/Mo mole ratio was then 6.

The molybdenum trioxide was dissolved over 1 h30 by heating under reflux at 80° C. When the solution became clear, it then had to be reduced in volume to 62 ml by heating. Once the temperature had returned to ambient temperature, the pH was measured and the value obtained was 0.05.

Cobalt carbonate (8.6 g, 99% purity) was then introduced cautiously in small quantities to avoid any uncontrolled exothermicity and effervescence; the carbonate dissolved immediately; the pH of the solution obtained was 3.6.

The Co/Mo atomic ratio of this solution was 0.49.

The molybdenum concentration was 2.4 mol/l.

The Raman spectrum of the solution which had been prepared had characteristic peaks for $Co_2Mo_{10}Co$ salts in solution at 957, 917, 602, 565, 355, 222 cm$^{-1}$ and for $CoMo_6(Co)$ in solution at 952, 903, 575, 355 and 222 cm$^{-1}$.

EXAMPLE 2

Preparation of a Solution of $Co^{II}_3$ [$Co^{III}_2Mo_{10}O_{38}H_4$], Corresponding to the Dimeric Anderson Heteropolyanion (in Accordance with the Invention)

The $Co^{II}_3[Co^{III}_2Mo_{10}O_{38}H_4]$ solution was prepared as described in Example 4 of French patent application FR-2 843 050.

A solution containing $Co^{II}_3[Co^{III}_2Mo_{10}O_{38}H_4]$ alone was obtained.

EXAMPLE 3

Preparation of a Solution of $Co^{II}_{3/2}$ [$Co^{III}_2Mo_6O_{24}H_6$] Alone, Corresponding to the Monomeric Anderson Heteropolyanion (not in Accordance with the Invention)

The solution of $Co^{III}_{3/2}[Co^{III}Mo_6O_{24}H_6]$ alone was prepared as described in Example 2 of French patent application FR-2 843 050.

A solution containing $Co^{III}_{3/2}[Co^{III}Mo_6O_{24}H_6]$ alone was obtained.

EXAMPLE 4

Preparation (in Accordance with the Invention) of the $Ni^{II}_2[Ni^{II}Mo_6O_{24}H_6]$ Salt 2.4 g of $MoO_3$ (96% pure) was introduced into 10 ml of 30% vol $H_2O_2$. The mixture was heated under reflux for 1 h30 at 80° C. The oxidizing agent/molybdenum source mole ratio was 6. Next, 1.254 g of nickel in the [$NiCO_3,2Ni(OH)_2, 4H_2O$] form was slowly added with 0.7 ml of HCl. The Ni/Mo mole ratio was thus 0.64.

The Raman spectrum of the solution obtained had the principal characteristic peaks of Mo—O bonds: 955, 906, 560, 360 cm$^{-1}$.

Emulsification was carried out using the protocol of Example 6.

EXAMPLE 5

Preparation of a Solution of Ammonium Heptamolybdate (HMA) and Cobalt Nitrate (not in Accordance with the Invention)

Solution 4 was prepared from a volume of 75 ml of water; it contained 10.6 g of ammonium heptamolybdate (HMA) with formula $(NH_4)_6Mo_7O_{24},4H_2O$ and 7.2 g of cobalt nitrate $Co(NO_3)_2,6H_2O$.

The Co/Mo atomic ratio of this solution was 0.41.
The molybdenum concentration was 1.0 mol/l.
The pH of the solution was 5.
The preparation of Example 5 corresponded to a simple dissolution of salts and no heteropolyanion combining molybdenum, cobalt and/or nickel in its structure was formed.

EXAMPLE 6

Dissolution of Solutions of Examples 1, 2, 3, 4 and 5

Solutions 1, 2, 3, 4 and 5 were emulsified in a heavy organic phase containing asphaltenes diluted in a light aromatic fraction of the LCO type with the following characteristics:
Density: 0.965;
Asphaltenes content (C7 insolubles): 8% by weight.
The mixture was produced at ambient temperature, with stirring, after slowly adding the aqueous solution to the oil in an amount of ¼ aqueous solution to ¾ oil.

The emulsion formed rapidly. The asphaltene/Mo ratio in the two cases was more than 1.

The concentration of molybdenum in the final mixture was respectively:
5.4% by weight for the solution from Example 1=>emulsion A;
1.9% by weight for the solution from Example 5=>emulsion E.

These emulsions were then re-mixed with the feed to compare the catalytic activities at Mo and cobalt iso-concentration (500 ppm).

EXAMPLE 7

Performance Comparison for Slurry Mode Residue Hydroconversion in a Batch Reactor of Emulsions A, B, C, D and E from Example 6

The slurry mode residue hydroconversion performances of catalysts derived from emulsions A, B, C, D and E were compared in a batch reactor.

The emulsions produced in Example 3 were mixed with the feed to obtain Mo contents of 500 ppm.

The feed used was a (RA) Zuata atmospheric residue, rich in metals and with the following characteristics:

| Feed | RA ZUATA |
|---|---|
| Spec. grav | 1.045 |
| Sulphur (weight %) | 4.35 |
| Nitrogen (ppm by weight) | 9000 |
| Viscosity (cSt) | 900 |
| Temp. viscosity (° C.) | 125 |
| C. Conradson (% by weight) | 19.95 |
| Asphaltenes C7 (% by weight) | 13 |
| Ni (ppm by weight) | 134 |
| V (ppm by weight) | 660 |
| SD: IBP ° C. | 295 |
| SD: 05% vol, ° C. | 375 |
| SD: 10% vol, ° C. | 419.5 |
| SD: 30% vol, ° C. | 540 |
| SD: 48% vol, ° C. | 613.5 |
| D1160: 60% vol, ° C. | — |

The hydroconversion conditions in the batch reactor were as follows:
temperature: 410° C.;
$H_2$ pressure: 15 MPa
Residence time: 2 h.
The autoclave test was carried out in two steps:
step for transformation of catalytic precursor into sulphide phase and elimination of water: the emulsion containing the catalytic precursor was mixed with the RA feed in the presence of DMDS (dimethyldisulphide) at a hydrogen pressure of 10 MPa. It was heated in its entirety to 350° C. for one hour: this temperature allowed the DMDS to decompose and thus generate a partial pressure of $H_2S$ without causing thermal conversion reactions to occur. This step allowed the sulphurization of molybdenum and the formation of $MoS_2$ dispersed in the feed;

next, the reactor was cooled to a temperature below 100° C. to eliminate the $H_2$ and $H_2S$ by nitrogen stripping (and possibly residual water in the medium). The hydroconversion step proper could then be initiated under the conditions defined above: temperature: 410° C., partial pressure of $H_2$: 15 MPa, residence time: 2 h.

At the end of the test, the solid phase was separated from the liquid phase by hot filtration; the metal and asphaltene analyses were carried out on the filtrate to determine the % HDM (hydrodemetallization) and HDAsph (hydrodeasphalting).

| Experiment | Catalytic precursor | Conv (wt %) | HDM (wt %) | HDAsph (wt %) |
|---|---|---|---|---|
| 1 emulsion A (in accordance) | $Co_2Mo_{10}Co$ $CoMo_6(Co)$ | 57 | 82 | 65 |
| 2 emulsion B (in accordance) | $Co_2Mo_{10}Co$ | 59 | 85 | 65 |
| 3 emulsion C (not in accordance) | $CoMo_6(Co)$ | 55 | 80 | 61 |
| 4 emulsion D (in accordance) | $Ni^{II}_2[Ni^{II}Mo_6O_{24}H_6]$ | 60 | 86 | 66 |
| 5 emulsion E (not in accordance) | HMA + Co nitrate | 55 | 76 | 60 |

The results shown in the above table demonstrate that for a slightly higher conversion, the HDM and hydrodeasphalting performances are significantly better when a catalytic precursor of the heteropolyanion type combining composition and molybdenum in its structure is used.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application Ser. No. 07/01,982, filed Mar. 16, 2007, is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for converting heavy feeds carried out in a slurry reactor in the presence of hydrogen and an unsupported solid catalyst, said catalyst being obtained from an aqueous solution containing at least one cobalt and/or nickel salt of at least one heteropolyanion combining molybdenum and cobalt in its structure, said salt being $Co^{II}_3[Co^{III}_2Mo_{10}O_{38}H_4]$, or $Ni^{II}_3[Co^{III}_2Mo_{10}O_{38}H_4]$, alone or respectively as a mixture with the salt $CO^{II}_{3/2}[Co^{III}Mo_6O_{24}H_6]$ or the salt $Ni^{II}_2[Ni^{II}Mo_6O_{24}H_6]$, or from an aqueous solution containing as salts only $Ni^{II}[Ni^{II}Mo_6O_{24}H_6]$ or $Ni^{II}_4[Ni^{II}_2Mo_{10}O_{38}H_4]$ or a mixture thereof, said process including the following steps:

a) mixing at least one source of molybdenum and at least one oxidizing compound in aqueous solution to synthesize peroxomolybdate ions at an acidic pH, in the mole ratio of said oxidizing compound to said molybdenum source in the range of 0.1 to 20;

b) introducing at least one cobalt and/or nickel precursor by one of the following pathways (b1, b2 or b3):

b1) introducing at least one cobalt precursor into the solution of step a) in the absence of a nickel precursor, to form a solution comprising at least said salt wherein the Co/Mo mole ratio is in the range 0.40 to 0.85;

b2) introducing at least one nickel precursor into the solution of step a) in the absence of a cobalt precursor, to form a solution comprising at least said salt wherein the Ni/Mo ratio is in the range 0.40 to 0.85;

b3) introducing at least one cobalt precursor and at least one nickel precursor into the solution of step a) to form a solution comprising at least said salts wherein the (Co+Ni)/Mo mole ratio is in the range 0.25 to 0.85, the Ni/Mo ratio is in the range 0.20 to 0.40 and the Co/Mo ratio is in the range 0.10 to 0.30;

c) introducing the aqueous solution obtained in step b) into a hydrocarbon oil containing asphaltenes and/or resins at a temperature below 60° C. to form an emulsion; and d) injecting said emulsion obtained at the end of step c) upstream of or directly into the slurry reactor so as to form dispersed particulate active molybdenum sulfide catalyst in the heavy feeds, mixed with hydrogen and sulfide and e) conducting said converting of heavy feeds in the slurry reactor.

2. A process according to claim 1, in which the source of molybdenum used in said step a) is molybdenum oxide $MoO_3$.

3. A process according to claim 2, in which said oxidizing compound is hydrogen peroxide.

4. A process according to claim 3, in which the (oxidizing compound/molybdenum source) mole ratio in step a) is in the range 2 to 7.

5. A process according to claim 1, in which said peroxomolybdate ions are present at the end of said step a) in an aqueous solution with a pH of less than 2.5.

6. A process according to claim 1, in which the solution formed at the end of said step b) has a pH of more than 3.

7. A process according to claim 1, in which the cobalt precursor and/or the nickel precursor used in said step b) is (are) selected from the group constituted by nitrates, sulphates, phosphates, halides, carboxylates such as acetates, carbonates, hydroxides and oxides.

8. A process according to claim 1, in which the cobalt precursor used in said steps b1) and b3) is cobalt carbonate.

9. A process according to claim 1, in which the nickel precursor used in said steps b2) and b3) is nickel hydroxycarbonate.

10. A process according to claim 1, in which at least one cobalt precursor is introduced into said solution from step a)

in the absence of nickel precursor, the quantity of said cobalt precursor being such that the Co/Mo ratio is in the range 0.40 to 0.55.

11. A process according to claim 1, in which at least one nickel precursor is introduced into said solution from step a) in the absence of cobalt precursor, the quantity of said nickel precursor being such that the Ni/Mo ratio is in the range 0.40 to 0.65.

12. A process according to claim 1, in which at least one cobalt precursor and at least one nickel precursor are introduced into said solution derived from said step a), the quantities of said cobalt and nickel precursors being such that the (Co+Ni)/Mo ratio is in the range 0.28 to 0.55.

13. A process according to claim 1, in which the concentration of molybdenum with respect to the heavy feed is in the range 10 to 1000 ppm by weight.

14. A process according to claim 1, in which the emulsion formed in step c) results from a mixture produced such that the (asphaltenes+resins)/(molybdenum) ratio is more than 1.

15. A process according to claim 1, in which said catalyst is obtained by bringing said emulsion obtained in step c) into contact with a portion of the liquid conversion products containing dissolved hydrogen sulphide, asphaltenes and/or resins, under temperature and pressure conditions which are close to the reaction conditions.

16. A process according to claim 1, in which said catalyst is obtained by bringing said emulsion into contact with a portion or all of the feed containing hydrogen sulphide before it reaches the reaction zone.

17. A process according to claim 1, in which said catalyst is obtained by bringing said emulsion into contact with the feed directly in the reactor.

18. A process according to claim 15, in which oxide particles are added to the feed-emulsion mixture, the oxide being selected from the group formed by alumina, silica, silica-alumina and titanium dioxide.

19. A process according to claim 15, in which coal or coke particles are added to the feed-emulsion mixture.

20. A process according to claim 18, in which the mean particle size is in the range 10 to 1000 microns and the particle concentration in the heavy hydrocarbon feed is in the range 0.5% to 10% by weight.

21. A process according to claim 18, in which the mean particle size is in the range 100 to 800 microns.

22. A process according to claim 18, in which said particles are alumina particles and have a porous polymodal structure composed of a plurality of juxtaposed agglomerates each formed by a plurality of acicular platelets, the platelets of each agglomerate being orientated radially with respect to each other and with respect to the centre of the agglomerate, said particles having an irregular and non-spherical shape and being mainly in the form of fragments obtained by crushing alumina beads and having the following characteristics:
- a loss on ignition, measured by calcining at 1000° C., in the range from about 1 to 15% by weight;
- a specific surface area in the range 75 to 250 m$^2$/g;
- a total pore volume (TPV) in the range 0.5 to about 2.0 cm$^3$/g;
- a pore distribution, determined by Hg porosimetry, which is characterized as follows:
  - a total pore volume of pores with a mean diameter of less than 100 Å: in the range 0 to 10%;
  - a total pore volume of pores with a mean diameter in the range 100 to 1000 Å: in the range 40% to 80%;
  - a total pore volume of pores with a mean diameter in the range 1000 to 5000 Å: in the range 5% to 60%;
  - a total pore volume of pores with a mean diameter in the range 5000 to 10000 Å: in the range 3% to 50%;
  - a total pore volume of pores with a mean diameter of more than 10000 Å: in the range 5% to 20%.

23. A process according to claim 22, in which the pore volume of said alumina particles is such that the percentage of the total pore volume in pores with a mean diameter of more than 1000 Å is more than 20% and the mean diameter of pores with a diameter of more than 1000 Å is in the range 4000 to 6000 Å.

24. A process according to claim 1, in which the slurry reactor is supplied with a heavy hydrocarbon feed with a boiling point of more than 540° C. for at least 60% by weight of the compounds of the feed, and operates under the following conditions:
- total pressure in the range 1 to 50 MPa;
- partial pressure of hydrogen in the range 1 to 50 MPa;
- temperature in the range 300° C. to 600° C.;
- residence time of hydrocarbons in the reaction zone in the range 5 minutes to 20 hours.

25. A process according to claim 1 wherein no solids are added to the emulsion feed.

26. A process according to claim 11 wherein the quantity of the nickel percursor results in an aqueous solution containing $Ni^{II}_2[Ni^{III}Mo_6O_{24}H_6]$ as the only salt of a heteropolyanion combining molybdenum and nickle in its structure.

* * * * *

UNITED STATES PATENT AND TRADEMARK OFFICE
CERTIFICATE OF CORRECTION

PATENT NO. : 7,935,244 B2  
APPLICATION NO. : 12/076237  
DATED : May 3, 2011  
INVENTOR(S) : Magalie Roy-Auberger et al.

Page 1 of 1

It is certified that error appears in the above-identified patent and that said Letters Patent is hereby corrected as shown below:

In claim 26, at column 14, line 45 (the last line) reads: "combining molybdenum and nickle in its structure." Should read: --combining molybdenum and nickel in its structure.--.

Signed and Sealed this
Twenty-eighth Day of February, 2012

David J. Kappos
*Director of the United States Patent and Trademark Office*